United States Patent
Iwata et al.

(10) Patent No.: US 10,199,900 B2
(45) Date of Patent: Feb. 5, 2019

(54) ROTATING MACHINE

(71) Applicant: Hitachi, Ltd., Chiyoda-ku, Tokyo (JP)

(72) Inventors: Takeshi Iwata, Tokyo (JP); Hiroaki Kojima, Tokyo (JP); Motonobu Iizuka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 512 days.

(21) Appl. No.: 14/919,899

(22) Filed: Oct. 22, 2015

(65) Prior Publication Data

US 2016/0118867 A1 Apr. 28, 2016

(30) Foreign Application Priority Data

Oct. 24, 2014 (JP) ................... 2014-216813

(51) Int. Cl.
*H01R 39/38* (2006.01)
*H01R 4/01* (2006.01)
*H02K 5/14* (2006.01)
*H02K 11/00* (2016.01)
*H02K 9/28* (2006.01)
*H02K 11/25* (2016.01)

(52) U.S. Cl.
CPC .......... *H02K 5/141* (2013.01); *H01R 39/381* (2013.01); *H02K 9/28* (2013.01); *H02K 11/001* (2013.01); *H02K 11/0042* (2013.01); *H02K 11/25* (2016.01); *H01R 4/01* (2013.01)

(58) Field of Classification Search
CPC . H02K 5/14–5/148; H02K 9/28; H02K 11/25; H01R 4/01; H01R 39/38–39/44
See application file for complete search history.

(56) References Cited

U.S. PATENT DOCUMENTS 4,567,414 A  1/1986  Berings

FOREIGN PATENT DOCUMENTS

| JP | 50-15017 A | | 2/1975 | |
|---|---|---|---|---|
| JP | 60039340 A | * | 3/1985 | ............. H01R 39/40 |
| JP | 2-33578 U | | 3/1990 | |
| JP | 2010-124528 A | | 6/2010 | |

OTHER PUBLICATIONS

Japanese-language Office Action issued in counterpart Japanese Application No. 2014-216813 dated Apr. 17, 2018 with English translation (seven (7) pages).

* cited by examiner

*Primary Examiner* — Ramon M Barrera
(74) *Attorney, Agent, or Firm* — Crowell & Moring LLP

(57) ABSTRACT

The present invention provides a rotating machine which can maintain good contact state between the brush and the metal rotating body. A rotating machine of the present invention includes a stator including a stator winding, a rotor including a rotor winding and rotatably disposed apart from the stator with a gap, a metal rotating body electrically coupled with the rotor winding, a brush in contact with the metal rotating body, and a pressing mechanism for increasing pressure to press the brush against the metal rotating body when contact failure occurs between the metal rotating body and the brush.

2 Claims, 7 Drawing Sheets

ROTATING MACHINE

CLAIM OF PRIORITY

The present application claims priority from Japanese Patent Application JP 2014-216813 filed on Oct. 24, 2014, the content of which is hereby incorporated by reference into this application.

FIELD OF THE INVENTION

The present invention relates to a rotating machine, and more particularly, to the rotating machine having a brush brought into contact with a slipring or a commutator in the rotating machine.

BACKGROUND OF THE INVENTION

In general, the rotating machine with brush is configured to hold the brush in the brush holder and press the brush from the back surface with the spring so that the brush is brought into contact with the slipring or the commutator (hereinafter referred to as "metal rotating body") under the predetermined force. A predetermined current is passed through the brush for the purpose of outputting the generated power to the outside with holding the contact state or supplying power to the rotor for rotation. The brush is designed to maintain good sliding relationship between the brush and the metal rotating body to prevent burnout and abnormal wear caused by the contact failure. In the case where the spring pressure to the brush is strong, the brush is strongly pressed against the metal rotating body. Therefore, the electrical loss is lessened, but the mechanical loss is increased. In the case where the spring pressure to the brush is weak, the brush is not sufficiently pressed against the metal rotating body, which may cause increased electrical loss and vibration of the brush. Therefore, it is necessary to consider various factors, such as the amount of applied current, the rotating speed and the like, for selecting the brush pressing.

JP 2010-124528, for example, discloses a structure which allows the constant pressure to be applied by attaching the elastic material or the adjustment material to the pressure part and allows the pressure to be adjusted depending on the presence or absence of the current flow for the purpose of bringing the brush into stable contact with the metal rotating body.

The rotating machine with the brush and metal rotating mechanism will reduce the replacement cycle of the brush owing to abnormal wear and burnout accident of the brush caused by the contact failure between the brush and the metal rotating body. Accordingly, the contact state between the brush and the metal rotating body is required to be maintained in good condition.

The structure disclosed in JP 2010-124528 is configured to have the adjustment material at the pressure part to vary the pressure for each operating condition. However, good contact state between the brush and the metal rotating body cannot be achieved in the case where the load of the rotating machine is increasing when used and where the contact state is deteriorated between the brush and the metal rotating body.

The present invention provides a rotating machine which can maintain good contact state between the brush and the metal rotating body.

SUMMARY OF THE INVENTION

The present invention provides a rotating machine which includes a stator including a stator winding, a rotor including a rotor winding and rotatably disposed apart from the stator with a gap, a metal rotating body electrically coupled with the rotor winding, a brush in contact with the metal rotating body, and a pressing mechanism for increasing pressure to press the brush against the metal rotating body when contact failure occurs between the metal rotating body and the brush.

According to the present invention, a rotating machine is provided which can maintain good contact state between the brush and the metal rotating body.

DETAILED DESCRIPTION OF THE PREFERRED EMBODIMENTS

Figure 1:
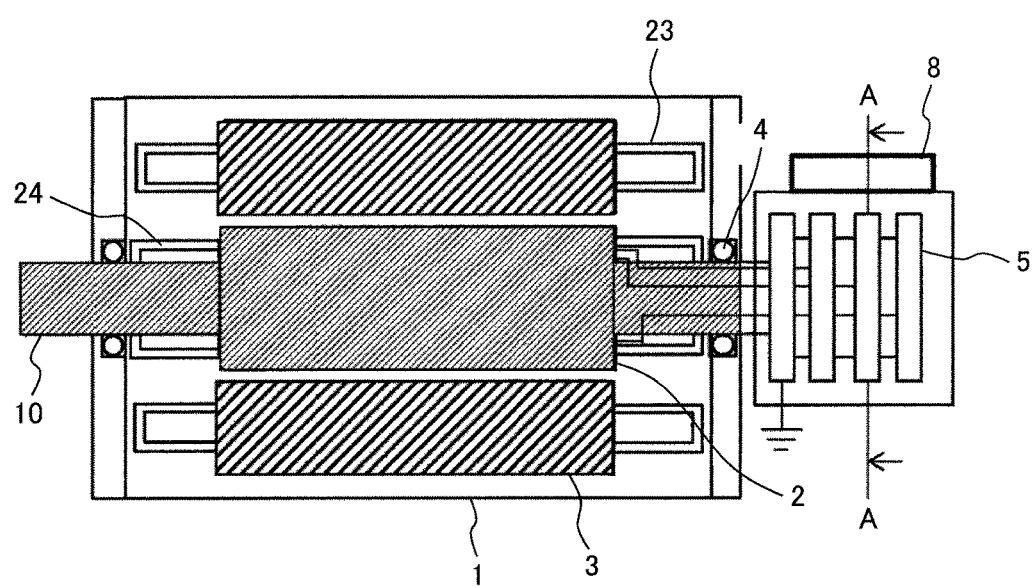
FIG. 1 represents an exemplary structure of a rotating machine.

Embodiments of the present invention will be described referring to the drawings.

The rotating machine of the respective embodiments will be described, taking a wind power generator as an example. The present invention is not limited to the one as described above, which is applicable to any rotating machine with brush. The effect of the present invention may be significantly obtained through application to the rotating machine having relatively a large capacity (for example, 1.0 MW to 10 MW) with fluctuating load.

The structure of the generator will be briefly explained referring to FIG. 1. As FIG. 1 shows, the generator includes a rotor 2, a stator 3 which is disposed facing the rotor 2 apart therefrom with a gap, and a body frame 1 containing the rotor 2 and the stator 3. The rotor 2 has a rotor winding 24, and the stator 3 has a stator winding 23. The rotor winding 24 is electrically coupled with a slipring 5 to be described below. The rotor 2 includes a rotating shaft 10 extending from the body frame 1, and the rotating shaft 10 of the rotor 2 is supported by a bearing 4 against the body frame 1. The slipring 5 is attached to the rotating shaft 10. FIG. 1 represents an exemplary structure of the slipring 5 including three rings for collecting the generated power and a ring for grounding. There may be the case where the slipring 5 has a spiral groove formed thereon to allow the brush 6 to be in contact with the entire surface, which is not shown herein.

Figure 2:
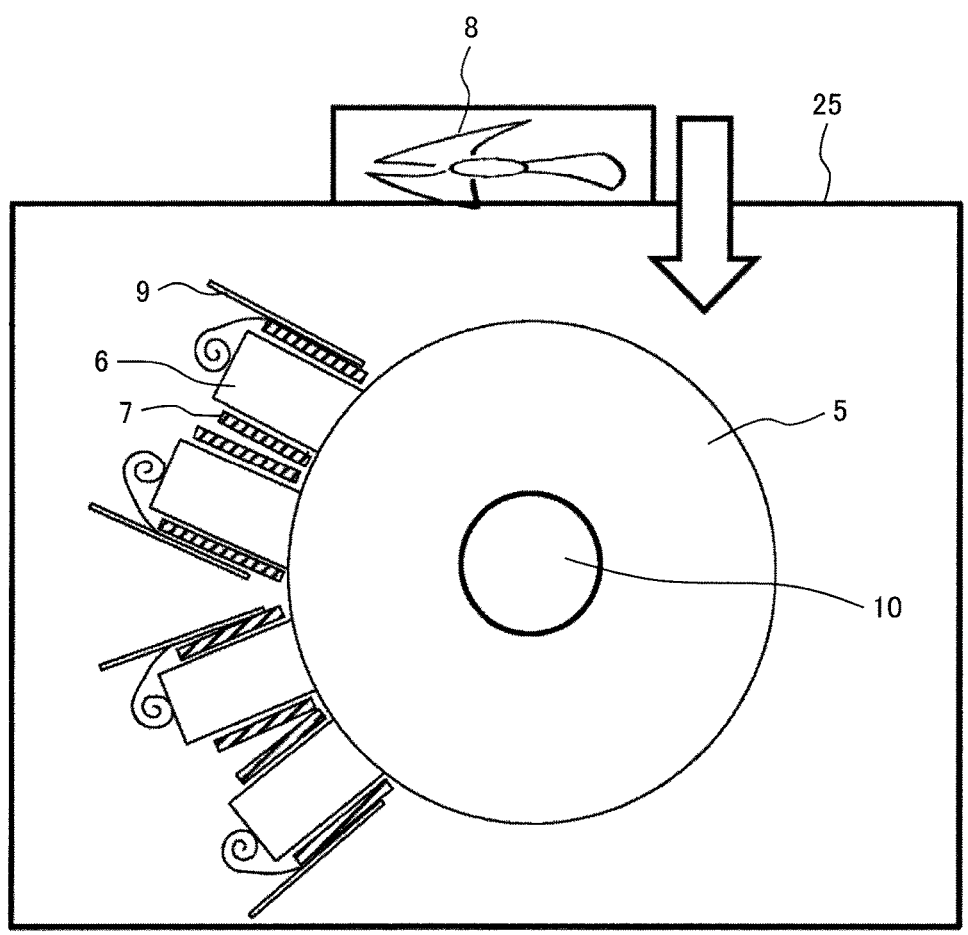
FIG. 2 is a sectional view taken along line A-A of FIG. 1.

FIG. 2 is a sectional view taken along line A-A of FIG. 1, illustrating brush holders 7 (four in the embodiment), each of which holds the brush 6 on each phase of the slipring 5. The brush holder 7 has a cylindrical shape with both open ends so that the brush 6 is easily detachable. The brush 6 is disposed apart from the brush holder 7 with a gap so that the brush 6 is slidably held with the brush holder 7. The brush 6 is pressed against the slipring 5 with a predetermined force by a pressing mechanism 9. The brush 6 and the slipring 5 are contained in a case 25. A cooling fan 8 is used for promoting cooling inside the case 25 and for suppressing the temperature rise of the brush 6. FIG. 2 represents an exemplary use of a constant load spiral spring fixed to the side surface of the brush holder 7 so that the pressure of the pressing mechanism 9 does not vary with the wear of the brush 6. The pressing mechanism 9 may be constituted with any type of spring such as coil spring as well as the spiral spring.

Figure 3:
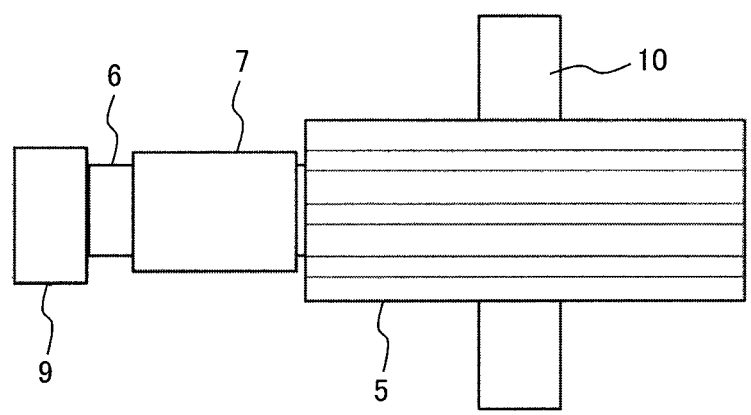
FIG. 3 is a schematic view illustrating a structure of a brush and slipring for making the pressure applied to the brush variable.

FIG. 3 is a view schematically showing a structure of a contact part between the brush 6 and the slipring 5. The slipring 5, the brush 6, and the brush holder 7 are arranged in the same way as the arrangement shown in FIG. 2. Changing the structure of the pressing mechanism 9 allows the pressure to vary upon detection of the contact failure so that good contact state between the brush 6 and the slipring 5 is maintained. The change caused by the contact failure includes the temperature rise, contact voltage drop, excessive torque-increase more than necessary and the like.

First Embodiment

Figure 4:
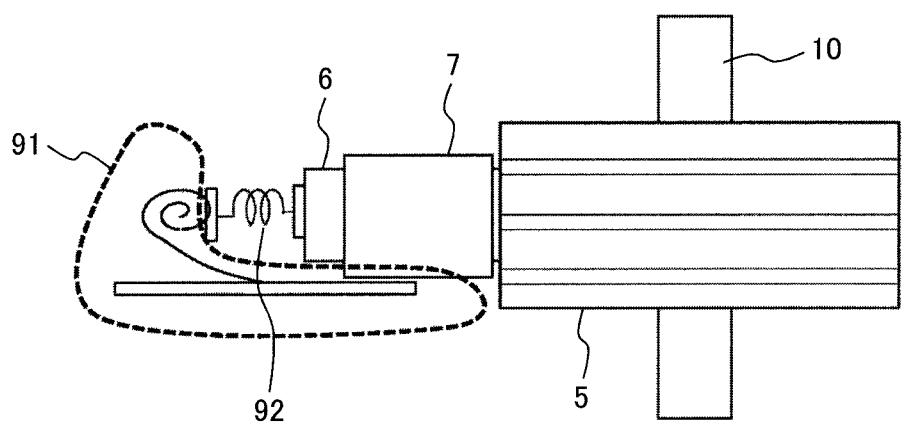
FIG. 4 represents an exemplary structure in which the pressing mechanism shown in FIG. 3 is constituted by a spiral spring and a shape-memory alloy spring.

A first embodiment of the rotating machine with brush according to the present invention will be described in detail referring to FIG. 4. This embodiment shows an exemplary use of the spiral spring and the shape-memory alloy spring for constituting the pressing mechanism. FIG. 4 is a view representing an exemplary structure of the brush 6, the brush holder 7, and the pressing mechanism 9 according to the embodiment. In the embodiment, referring to FIG. 4, a spiral spring 91 and a shape-memory alloy spring 92 are combined to constitute the pressing mechanism 9 for increasing the pressure applied to the brush 6 upon the contact failure. In this embodiment, the brush 6 is connected to the brush holder 7 using the shape-memory alloy spring 92 and the spiral spring 91. The spiral spring 91 is fixed to the side surface of the brush holder 7. In the stable contact state, the pressure does not vary with wear of the brush 6 as the constant load spring is used. The spiral spring 91 is disposed at the side closer to the brush holder 7 than the shape-memory alloy spring 92. The shape-memory alloy spring 92 is attached to the spiral spring 91 at the side closer to the brush 6. The shape-memory alloy spring 92 is configured to restore its original shape in spite of deformation exerted to the shape-memory alloy at least at the temperature upon contact failure. The spiral spring 91 urges the brush 6 to press against the slipring 5 under the constant pressure so that the shape-memory alloy spring 92 increases the pressure upon the temperature rise. As a result, the constant pressure is maintained irrespective of wear of the brush 6, which makes it possible to vary the pressure as necessary in accordance with temperature change of the brush 6.

The embodiment is configured to be able to cope with the contact failure especially caused by rise in the temperature equal to or higher than the predetermined value. It is possible to use Ni—Ti alloy, for example, as a material for forming the shape-memory alloy spring 92. It is also possible to use any other material having the function for making the spring pressure variable in accordance with the temperature. Instead of the shape-memory alloy spring 92, the bimetal may be employed for adjusting the pressure applied to the brush 6.

The brush 6 raises its temperature owing to heat generated by current flow and friction on the sliding surface. In the case of good contact state, the temperature will become constant after an elapse of a certain amount of time. When the contact failure occurs in the brush 6, a contact voltage drop between the brush 6 and the slipring 5 becomes large to increase the amount of heat generated by current flow. This may increase the temperature of the brush 6 higher than that in good contact state. In other words, the contact voltage drop between the brush 6 and the slipring 5 may be reduced by using the shape-memory alloy spring 92 for the pressing mechanism 9, which increases the pressure when the temperature of the brush 6 becomes higher than the predetermined value (the shape recovery temperature). As a result, heat generated by current flow is suppressed to lower the temperature of the brush 6, leading to maintenance of good contact state and reduction of the wear of the brush 6. The spring constant and temperature property of the shape-memory alloy spring 92 may be determined based on the generated heat value depending on the condition for use such as current and rotation speed, and based on performance of the cooling fan 8.

The embodiment is configured to make the brush 6 slidable on the slipring 5 with maintaining good contact state therebetween. This makes it possible to prevent abnormal wear and burnout of the brush 6 and the slipring 5 caused by the heat generated by the contact failure. The shape-memory alloy sprig 92 serves as not only the pressure adjustment but also the temperature sensor, resulting in simplified structure. The embodiment is also configured to automatically apply the desired pressure (based on physical properties) without monitoring the operation state, resulting in improved maintainability.

Second Embodiment

Figure 5:
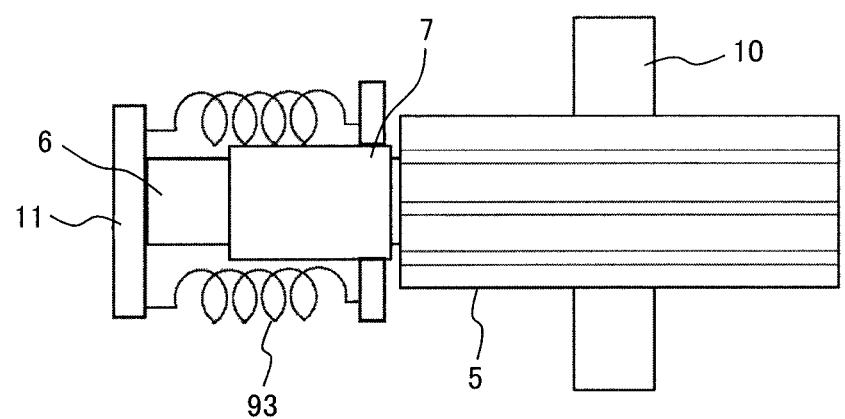
FIG. 5 represents an exemplary structure in which the pressing mechanism shown in FIG. 3 is constituted by a shape-memory alloy coil spring.

A second embodiment of the rotating machine with brush according to the present invention will be described in detail referring to FIG. 5. This embodiment is configured to use a shape-memory alloy spring 93 (especially, the coil spring is used in this example) as a spring for pressing the brush 6 against the slipring 5. In the embodiment, a brush pressing plate 11 is disposed between the shape-memory alloy spring 93 and the brush and the brush pressing plate 11 presses the brush 6 so that the brush 6 approaches the slipring 5. According to the embodiment of the structure including the shape-memory alloy coil spring 93 and the brush 6, the coil spring 93 is disposed between the brush pressing plate 11 and the brush holder 7 to connect the brush holder 7 at the side closer to the slipring 5 and the brush pressing plate 11.

In this embodiment, good contact state between the brush 6 and the slipring 5 may be recovered from the contact failure by detecting the temperature rise resulting from the temperature rise of the shape-memory alloy coil spring 93 in excess of the shape memory recovery temperature and by increasing the pressure applied to the brush 6. This makes it possible to prevent abnormal wear and burnout of the brush 6 and the slipring 5. Locating the spring as close as possible to the sliding surface enables correct detection of the temperature in the abnormal state. Furthermore, automatic application of the desired pressure (based on physical properties) is possible without monitoring the operation state, resulting in improved maintainability.

Third Embodiment

Figure 6:
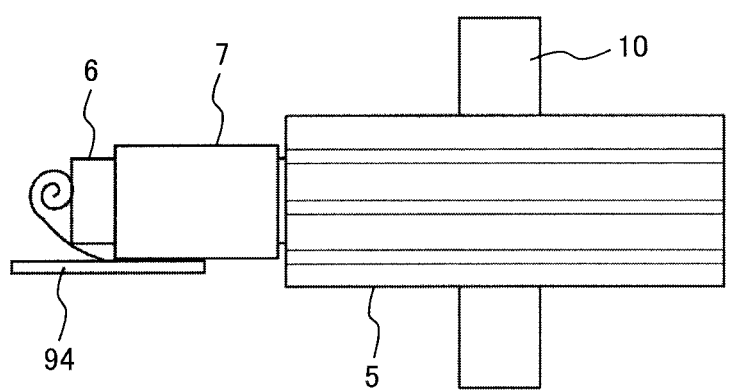
FIG. 6 represents an exemplary structure in which the pressing mechanism shown in FIG. 3 is constituted by a shape-memory alloy spiral spring.

A third embodiment of the rotating machine with brush according to the present invention will be described in detail referring to FIG. 6. This embodiment is configured to use a shape-memory alloy spiral spring 94 as a spring for pressing the brush 6 against the slipring 5. The structure of this embodiment uses the shape-memory alloy spiral spring in place of the spiral spring for the pressing mechanism 9 shown in FIG. 2. The shape-memory alloy spring 94 of this embodiment directly connects the brush 6 and the brush holder 7.

In this embodiment, good contact state between the brush 6 and the slipring 5 may be recovered from the contact failure by detecting the temperature rise with the shape-memory alloy spiral spring 94 and by increasing the pressure applied to the brush 6. This makes it possible to prevent abnormal wear and burnout of the brush 6 and the slipring 5 with simple structure advantageously. Furthermore, automatic application of the desired pressure (based on physical properties) is possible without monitoring the operation state, resulting in improved maintainability.

Fourth Embodiment

Figure 7A:
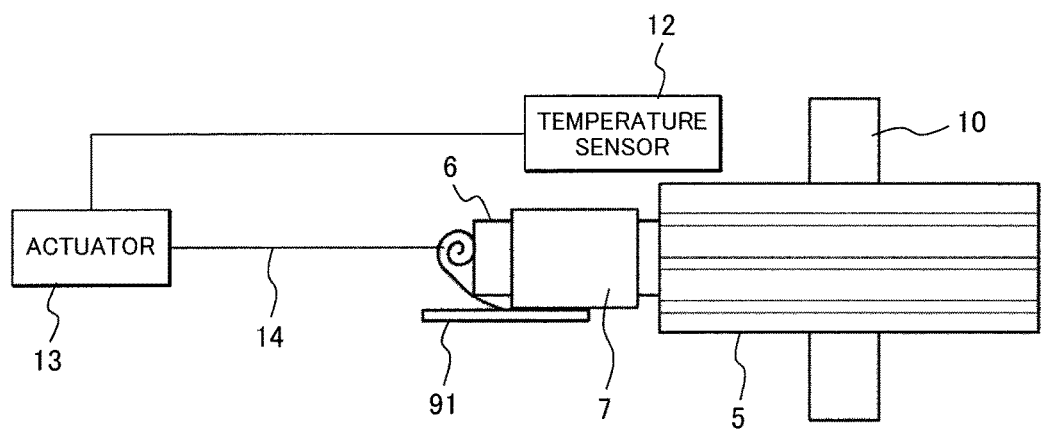
FIG. 7A represents an exemplary structure of the pressing mechanism using a temperature sensor for detecting the contact failure.
Figure 7B:
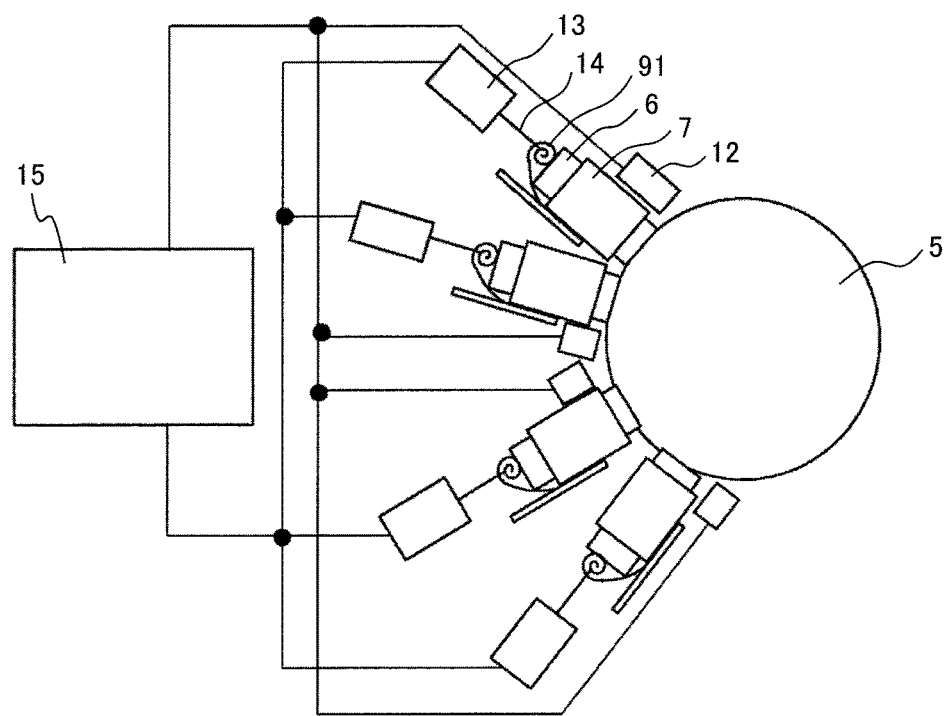
FIG. 7B represents an example that four brushes are provided on the single phase of the slipring.

A fourth embodiment of the rotating machine with brush according to the present invention will be described in detail referring to FIGS. 7A and 7B. In each of the aforementioned embodiments, the shape-memory alloy spring is used for the pressing mechanism. This embodiment uses a temperature sensor for the pressing mechanism. Referring to FIG. 7A, the embodiment is configured to dispose a temperature sensor 12 around the sliding surface to measure the temperature of the brush 6 so that the contact failure between the slipring 5 and the brush 6 is detected when the temperature of the brush 6 becomes equal to or higher than the threshold. When the contact failure is detected, additional operation force is newly applied or the operation force is increased by an actuator 13 to vary the pressure applied to the brush 6. The embodiment uses, as the spiral spring 91, the spiral spring for generating the spring pressure that enables recovery of the contact state from the contact failure (caused by the temperature rise of the brush 6). There may be various cases of the contact failure detection using various sensors, such as detection of deviation of the value from the predetermined one through the signal processing and detection of output of the signal indicating the failure, which will apply to the following embodiments.

If the temperature of the brush 6 is equal to or lower than the threshold, a linking mechanism 14 is passed through a spiral part of the spiral spring 91 and pulled by the actuator 13 to weaken the pressure of the spring to achieve the pressure applied to the brush 6 to be attained in good contact state. If the temperature of the brush 6 is equal to or higher than the threshold, the actuator 13 is activated to loosen the linking mechanism 14 pulling the spiral spring so that the pressure is increased. This makes it possible to vary the pressure applied to the brush 6 through temperature measurement of the brush 6. It is to be understood that the specific configurational relationship described above is not necessarily essential. Although the actuator 13 is used as the device for adjusting the pressure, any other device may also be used if the similar function is included. It is possible to use the measuring instrument of contactless type, such as the radiation thermometer, or contact type, such as the thermocouple, as the temperature sensor 12.

This embodiment also allows recovery of good contact state between the brush 6 and the slipring 5 from the contact failure by increasing the pressure applied to the brush 6, preventing abnormal wear and burnout of the brush 6 and the slipring 5. In the case where four brushes 6 are attached to the single phase of the slipring 5 as shown in FIG. 7B, an arithmetic unit 15 is provided for reading temperature of each of the brushes 6 and determining the contact state to enable optimum adjustment of pressure applied to each of the brushes 6. If temperatures of all the brushes 6 exceed the threshold, the brush 6 in the worst contact state may be subjected to the pressure adjustment firstly to recover the contact state. Although this embodiment employs four brushes 6, two or more brushes are sufficiently effective to adjust the pressure applied to the brush 6 using the aforementioned arithmetic unit 15. In the case where a plurality of sensors are provided, the operation force to be transmitted is varied in accordance with the detection results of at least two sensors (via the arithmetic unit 15 in the embodiment), thus further improving reliability. The embodiment allows automatic control for applying the desired pressure, thus improving the maintainability.

Fifth Embodiment

Figure 8:
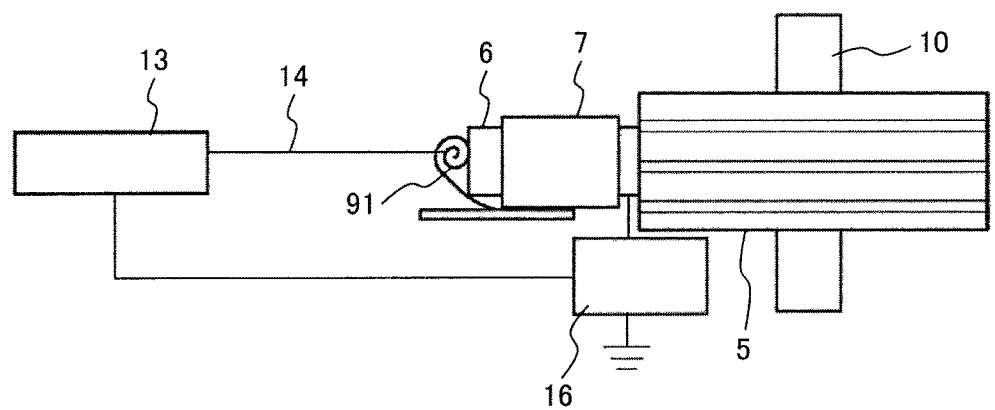
FIG. 8 represents an exemplary structure of the pressing mechanism using a voltage sensor for detecting contact failure.

A fifth embodiment of the rotating machine with brush according to the present invention will be described in detail referring to FIG. 8. The fourth embodiment uses the temperature sensor. The fifth embodiment is configured to vary the pressure applied to the brush 6 using the actuator 13 by measuring the voltage to ground of the brush 6 with a voltage sensor 16 disposed around the brush 6 to cope with the case where the voltage of the brush 6 becomes equal to or higher than the threshold or fluctuation of the voltage becomes large. In other words, the embodiment focuses on the voltage change among changes caused by the contact failure.

If the voltage to ground of the brush 6 largely fluctuates, the stable current path is not established between the brush 6 and the slipring 5. Therefore, it is determined that the contact failure occurs. When the contact failure is detected, additional operation force is newly applied or the operation force is increased by the actuator 13 to vary the pressure applied to the brush 6. Specifically, if the voltage of the brush 6 is equal to or lower than the threshold and fluctuation is small, the linking mechanism 14 is passed through the spiral part of the spiral spring 91 and pulled by the actuator 13. As a result, the pressure of the spiral spring 91 is weakened to establish the pressure applied to the brush 6 to be attained in good contact state. If the voltage of the brush 6 is equal to or greater than the threshold or the fluctuation is large, the actuator is activated to loosen the linking mechanism which pulls the spiral spring 91 to increase the pressure. With this configuration, the pressure applied to the brush 6 can be varied by measuring the voltage of the brush 6. It is to be understood that the configurational relationship described above is not necessarily essential. Although the actuator 13 is used as the device for adjusting the pressure, any other device with similar function may also be used. The contact voltage between the brush 6 and the slipring 5 may be measured as well as the voltage to ground of the brush 6.

The embodiment is configured to recover good contact state between the brush 6 and the slipring 5 from the contact failure by increasing the pressure applied to the brush 6, thus preventing abnormal wear and burnout of the brush 6 and the slipring 5. In the case where two or more brushes 6 are attached to the single phase of the slipring 5 as described in the fourth embodiment, the arithmetic unit is provided to enable optimum adjustment of the pressure applied to the respective brushes 6. In this embodiment which is configured to measure the voltage highly relevant to the contact failure, it is possible to determine the contact failure more accurately than in the fourth embodiment. Further, the embodiment enables application of the desired pressure under automatic control, resulting in improved maintainability.

Sixth Embodiment

Figure 9:
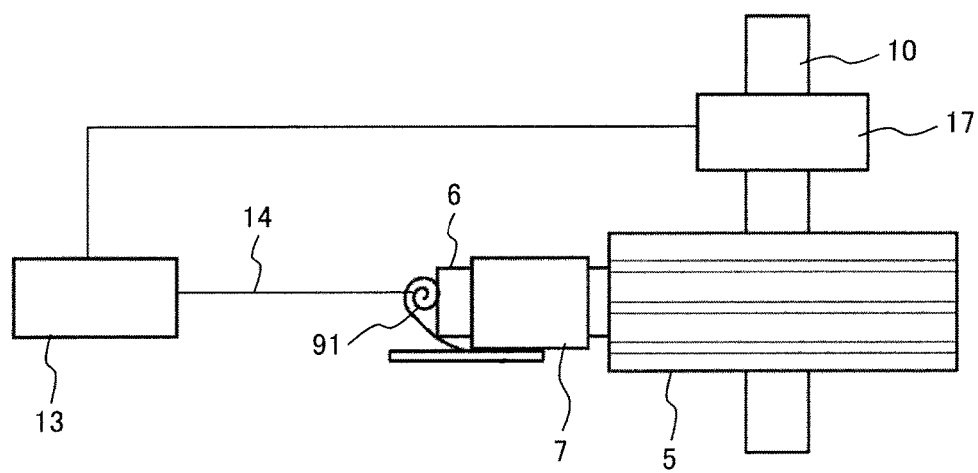
FIG. 9 represents an exemplary structure of the pressing mechanism using a torque sensor for detecting contact failure.

A sixth embodiment of the rotating machine with brush according to the present invention will be described in detail referring to FIG. 9. The embodiment is configured to attach a torque sensor 17 to the shaft 10 of the slipring 5 and to vary the pressure applied to the brush 6 using the actuator 13 in the case where the torque of the slipring 5 becomes equal to or greater than the threshold or fluctuation of the torque becomes large. If the torque fluctuation width of the slipring 5 is equal to or larger than the predetermined value, it may be determined that the contact failure has occurred. When the contact failure is detected between the slipring 5 and the brush 6 by the torque sensor 17, the pressure applied to the brush 6 is varied by newly applying or increasing the operation force by the actuator 13. Specifically, if the fluctuation of the torque of the slipring 5 is equal to or smaller than the threshold, the linking mechanism 14 is passed through the spiral part of the spiral spring 91 and pulled by the actuator 13. As a result, the pressure of the spring is weakened to establish the pressure applied to the brush 6 to be attained in good contact state. If the fluctuation of the torque of the slipring 5 is equal to or larger than the threshold, the actuator 13 is activated to loosen the linking mechanism 14 which pulls the spiral spring 91, resulting in the pressure to be obtained at the contact failure. Then, the pressure applied to the brush 6 may be varied by measuring the voltage of the brush 6. It is to be understood that the specific configurational relationship described above is not necessarily essential. Although the actuator 13 is used as the device for adjusting the pressure, any other device with similar function may also be used.

The embodiment is configured to recover good contact state between the brush 6 and the slipring 5 from the contact failure by increasing the pressure applied to the brush 6, thus preventing abnormal wear and burnout of the brush 6 and the slipring 5. In the case where two or more brushes 6 are attached to the single phase of the slipring 5 as described in the fourth embodiment, the arithmetic unit is provided to allow optimum adjustment of the pressure applied to the respective brushes 6. Further, the embodiment enables application of the desired pressure under automatic control, resulting in improved maintainability.

Seventh Embodiment

Figure 10:
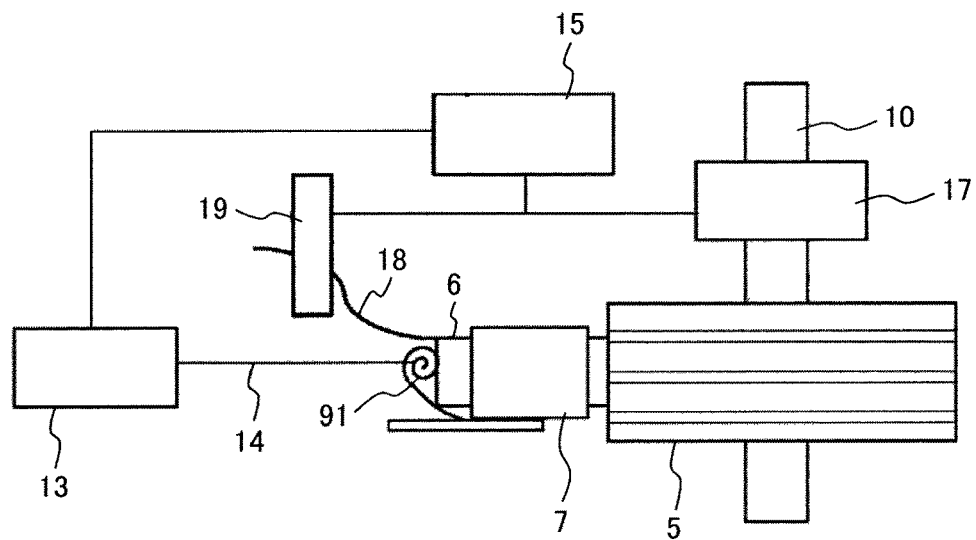
FIG. 10 represents an exemplary structure of the pressing mechanism using a torque sensor and a current sensor for detecting contact failure.

A seventh embodiment of the rotating machine with brush according to the present invention will be described in detail referring to FIG. 10. This embodiment is configured to include the torque sensor 17 attached to the shaft 10 of the slipring 5, a current sensor 19 attached to a lead wire 18 of the brush 6, and the arithmetic unit 15 to vary the pressure applied to the brush 6. As in the fourth to the sixth embodiments, the method of varying the pressure applied to the brush 6 uses the actuator 13 and the linking mechanism 14. The condition for varying the pressure is determined as follows. If the torque is larger than the predetermined value and the current is small, the pressure applied to the brush 6 is reduced as mechanical contact between the brush 6 and the slipring 5 is deteriorated. If the torque is smaller than the predetermined value, the pressure is increased irrespective of the current value as the contact between the brush 6 and the slipring 5 is insufficient. If the torque is larger than the predetermined value and the current is large, the pressure is either kept constant or increased. If the torque has a value in the predetermined range, the pressure in good contact state is applied to the brush 6. The combination of the current sensor 19 and the torque sensor 17 enables good contact state, maintaining the optimum current flow state. In this embodiment, the combination of two kinds of devices has been described as an example, that is, the current sensor 19 and the torque sensor 17. It is also possible to use various combinations including at least the above-described temperature sensor and the voltage sensor. Detection through a plurality of methods makes it possible to improve reliability. Although the current sensor 19 is used together with the torque sensor 17, each of the sensors may be separately used.

The embodiment is configured to recover good contact state between the brush 6 and the slipring 5 from the contact failure by varying the pressure applied to the brush 6, thus preventing abnormal wear and burnout of the brush 6 and the slipring 5. In the case where two or more brushes 6 are attached to the single phase of the slipring 5 as described in the fourth embodiment, each pressure applied to the brushes 6 may be optimally adjusted. Further, the embodiment enables application of the desired pressure under automatic control, resulting in improved maintainability.

Eighth Embodiment

An eighth embodiment of the rotating machine with brush according to the present invention will be described in detail referring to FIG. 7A and FIG. 7B. The embodiment is configured to include the temperature sensor 12 around the sliding surface for measuring the temperature of the brush 6 as in the fourth embodiment, and to detect the contact failure between the slipring 5 and the brush 6 if the measured temperature of the brush 6 becomes equal to or higher than the threshold. When the contact failure is detected, additional operation force is newly applied or the operation force is increased by the actuator 13 to vary the pressure applied to the brush 6. The spiral spring capable of generating the normal pressure in good contact state is used as the spiral spring 91. If temperature of the brush 6 is equal to or lower than the threshold, the actuator 13 serves to separate the linking mechanism 14 from the spiral spring 91 to establish the pressure applied to the brush 6 to be attained in good contact state. If temperature of the brush 6 is equal to or higher than the threshold, the actuator 13 is activated to allow the linking mechanism 14 to push the spiral spring to raise the pressure. This makes it possible to vary the pressure applied to the brush 6 by measuring the temperature of the brush 6. It is to be understood that the specific configurational relationship as described above is not necessarily essential. Although the actuator 13 is used as the device for adjusting the pressure, any other device with the similar function may also be used. It is possible to use the measuring instrument of contactless type, such as the radiation thermometer, or contact type, such as the thermocouple, as the temperature sensor 12. In the embodiment, the actuator 13 is controlled by the temperature sensor 12. However, the actuator 13 may be controlled by the voltage sensor or the torque sensor as in the fifth to the seventh embodiments.

The eighth embodiment is configured to recover good contact state between the brush 6 and the slipring 5 from the contact failure by increasing the pressure applied to the brush 6, thus preventing abnormal wear and burnout of the brush 6 and the slipring 5. In the case where two or more brushes 6 are attached to the single phase of the slipring 5 as described in the fourth embodiment, the arithmetic unit is provided to allow optimum adjustment of the pressure applied to the respective brushes 6. Further, the embodiment enables application of the desired pressure under automatic control, resulting in improved maintainability.

Ninth Embodiment

Figure 11:
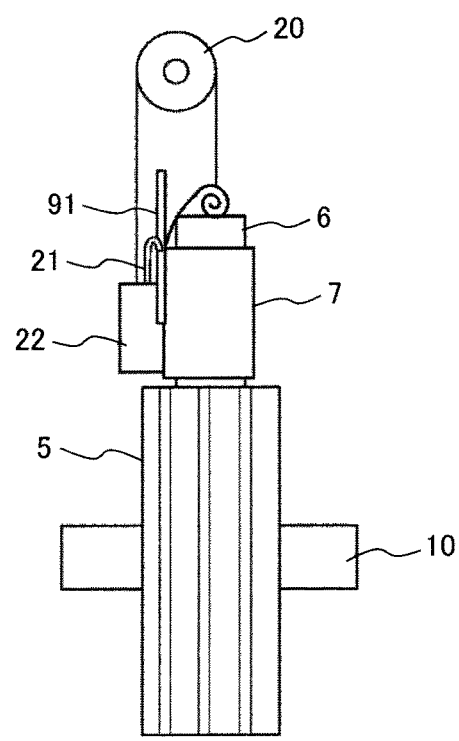
FIG. 11 represents an exemplary structure of the pressing mechanism using a weight for adjusting the spring pressure.

A ninth embodiment of the rotating machine with brush according to the present invention will be described in detail referring to FIG. 11. The pressing mechanism in this embodiment includes the shape-memory alloy as in the first to the third embodiments. However, the pressing mechanism in this embodiment is not formed in a spring form as in the above embodiments. The embodiment is configured so that the linking mechanism 14 is passed through the spiral part of the spiral spring 91 and a weight 22 with a shape-memory alloy hook 21 for pressure adjustment is suspended via a pulley 20. The shape-memory alloy hook 21 is brought into engagement with the brush holder 7 at a temperature equal to or higher than the threshold. At a temperature equal to or lower than the threshold, the hook 21 is disengaged from the brush holder 7. The spiral spring 91 exhibits the spring pressure capable of recovering the contact state from the contact failure upon temperature rise of the brush 6. The weight 22 for pressure adjustment weighs equally corresponding to the pressure to be increased at the contact failure. (This structure is just an example, and the weight 22 does not have to weigh equally corresponding to the pressure to be increased at the contact failure. It is just sufficient to be able to apply the pressure to recover the contact state from the contact failure by generating additional force derived under the condition where the support by the weight is unnecessary, including the case where the weight 22 is inclined.) If the temperature of the brush 6 is equal to or lower than the threshold, the pressure applied to the brush 6 is reduced in good contact state because the shape-memory alloy hook 21 is disengaged from the brush holder 7, which weakens the pressure of the spring as a result of pulling the linking mechanism 14 by the weight 22 for pressure adjustment. If the temperature of the brush 6 is equal to or higher than the threshold, the pressure of the spiral spring 91 increases the spring pressure which allows improvement of the contact state by loosening the linking mechanism 14 that has pulled the spiral spring 91 as a result of engagement of the shape-memory alloy hook 21 with the brush holder 7 to lift the weight 22 for pressure adjustment.

The ninth embodiment is configured to recover good contact state between the brush 6 and the slipring 5 from the contact failure by increasing the pressure applied to the brush 6, thus preventing abnormal wear and burnout of the brush 6 and the slipring 5.

The first to seventh embodiments provide a rotating machine which can maintain good contact state between the brush 6 and the slipring 5. Therefore, wear of the brush 6 is suppressed, and maintenance frequency of the rotating machine and loss such as electrical loss and mechanical loss is lessened. Furthermore, it is possible to apply the desired pressure automatically (based on physical properties) without monitoring the operation state, thus improving maintainability.

Having been described the preferred embodiments of the present invention, it is to be understood that the invention is not limited to those described above. It is possible to use various combinations and carry out modifications and replacements in the embodiment. The aforementioned embodiments use the slipring 5 as a metal rotating body for example. However, the commutator may also be used as a metal rotating body in the same way as the slipring 5.

In the case where the temperature sensor and the shape-memory alloy are provided in the embodiments, each temperature rise in the brush and the slipring has to be appropriately transmitted to the temperature sensor and the shape-memory alloy. Therefore, the temperature sensor, the shape-memory alloy, the brush, and the slipring are contained in the same case. It is effective to provide the cooling fan 8 as shown in FIG. 2 because the inner temperature of the case is increased when the contact failure occurs.

EXPLANATION OF REFERENCE CHARACTERS

1: body frame
2: rotor
3: stator
4: bearing
5: slipring
6: brush
7: brush holder
8: cooling fan
9: pressing mechanism
10: shaft
11: brush pressing plate
12: temperature sensor
13: actuator
14: linking mechanism
15: arithmetic unit
16: voltage sensor
17: torque sensor
18: lead wire
19: current sensor
20: pulley
21: shape-memory alloy hook
22: weight for pressure adjustment
23: stator winding
24: rotor winding
25: case
91: spiral spring
92: shape-memory alloy spring
93: shape-memory alloy coil spring
94: shape-memory alloy spiral spring

What is claimed is:
1. A rotating machine comprising:
a stator including a stator winding;
a rotor including a rotor winding, the rotor being rotatably disposed apart from the stator with a gap;
a metal rotating body electrically coupled with the rotor winding;
a brush in contact with the metal rotating body;
a brush holder for slidably holding the brush;

a pressing mechanism for increasing pressure to press the brush against the metal rotating body when contact failure occurs between the metal rotating body and the brush, the pressing mechanism including a shape-memory alloy spring and a spiral spring for connecting the brush and the brush holder, the spiral spring being disposed closer to the brush holder than the shape-memory alloy spring is;

wherein the brush and the brush holder are connected using the shape-memory alloy spring.

2. The rotating machine according to claim 1, further comprising:

a case which contains the shape-memory alloy, the metal rotating body, and the brush.

* * * * *